United States Patent [19]

Motonami et al.

[11] Patent Number: 4,650,241

[45] Date of Patent: Mar. 17, 1987

[54] SIDE DOOR HINGE MECHANISM IN MOTOR VEHICLE

[75] Inventors: Masanao Motonami; Hiromi Ikehata, both of Toyota, Japan

[73] Assignee: Toyota Jidosha Kabushiki Kaisha, Japan

[21] Appl. No.: 611,216

[22] Filed: May 17, 1984

[30] Foreign Application Priority Data

May 19, 1983 [JP] Japan ............................ 58-74913[U]

[51] Int. Cl.[4] .......................... B62D 27/00; B60J 5/00; E05D 15/28

[52] U.S. Cl. .................................... 296/187; 296/198; 296/202; 296/146; 16/370; 49/248

[58] Field of Search ........................ 296/146, 149–151, 296/198, 202, 206, 37.3, 76, 187; 49/246, 248, 208; 16/302, 366, 367, 370; 280/152 A, 152 B, 153 A, 153 B, 153.5, 154

[56] References Cited

U.S. PATENT DOCUMENTS

| | | | |
|---|---|---|---|
| 2,956,836 | 10/1960 | James et al. | 16/370 |
| 3,006,683 | 10/1961 | Smith | 49/248 |
| 3,074,755 | 1/1963 | Peras | 49/248 |
| 3,095,600 | 7/1963 | Bretzner | 49/248 |
| 3,275,370 | 9/1966 | Smith | 49/248 |
| 3,758,990 | 9/1973 | Balanos | 296/146 |

FOREIGN PATENT DOCUMENTS

| | | | |
|---|---|---|---|
| 1331484 | 8/1963 | France | 296/151 |

*Primary Examiner*—Robert B. Reeves
*Assistant Examiner*—Dennis H. Pedder
*Attorney, Agent, or Firm*—Finnegan, Henderson, Farabow, Garrett & Dunner

[57] ABSTRACT

A hinge mechanism for a vehicle door comprising a first arm and a second arm extending between the door section and the vehicle body for supporting the door section during opening and closing thereof. The first arm includes a first shaft for pivotally mounting the door section to the vehicle body and a second shaft for pivotally mounting the door section on the end of the first arm opposite the first shaft. The first shaft is mounted along the vehicle body and is positioned beneath a rearward section of a fixed fender portion. An attaching element rotatably mounts a movable fender portion on the first shaft for rotation with the first arm. The movable fender is adjacent to and substantially beneath the fixed fender portion when the door section is closed. The movable fender also includes an extension projecting forward of the first shaft, the extension defining a path of movement about the first shaft during opening and closing of the door section.

4 Claims, 3 Drawing Figures

SIDE DOOR HINGE MECHANISM IN MOTOR VEHICLE

BACKGROUND OF THE INVENTION

1. Field of the Invention

This invention relates to a side door hinge mechanism in a motor vehicle, in which a quadric crank chain mechanism is utilized.

2. Description of the Prior Art

In most cases, the side door in a motor vehicle, e.g. passenger car, is installed in a manner to be rotatable about a hinge affixed to a vehicle body for opening or closing. In order to allow an occupant of the motor vehicle to open or close the side door for getting in or out of the motor vehicle, a door opening angle corresponding to the total length of the side door is required. In certain circumstances, such as when a space at the side of the motor vehicle is small, there are many cases where it is difficult for the occupant to get in or out of the vehicle because the side door cannot be opened sufficiently.

To overcome these difficulties now, it has been desirable to use a front rotary link, which is formed by interconnecting the front portion of the side door, possibly the foremost point, and a position forward of the front pillar of the vehicle, so that the side door is slidable forwardly to a considerable extent.

However, if the above-described arrangement is adopted, then the front rotary link and the front fender generally interfere with each other.

Because of this problem, in U.S. Pat. No. 3,095,600 for example, the front rotary link has been considerably curved or, in U.S. Pat. No. 3,275,370, the front side door has been integrally formed with part of the front fender, whereby the interference of the rotary link with the front fender is avoidable.

However, in the case of the former, such disadvantages are presented that the mechanical strength of the curved rotary link decreased and a space for receiving the rotary link when the door is closed is excessively large.

In the case of the latter, such disadvantages are presented that of the weight and the area of the side door are increased, so that the side door with a design of some unusual shape, cannot be applied to normal passenger cars.

SUMMARY OF THE INVENTION

It is therefore the primary object of the present invention is to provide a side door hinge mechanism in a motor vehicle, capable of allowing an occupant of a vehicle to easily get in or out of the vehicle by opening a side door even when a space at the side of the vehicle is small.

The present invention has as its secondary object the provision of a quadric crank chain type side door hinge mechanism capable of allowing the occupant to further easily get in or out of the vehicle in a side door opened state.

The present invention has as its object the provision of a side door hinge mechanism in a motor vehicle, utilizing a quadric crank chain, in which a first arm or front rotary link extends between the side door and a position forwardly of the front pillar, of the vehicle frame without curving the rotary link, or designing the side door into an unusual shape, or increasing the weight and size of the side door.

To the above end, the present invention contemplates to provide a side door hinge mechanism in a motor vehicle wherein a quadric crank chain comprises: a front rotary link or first arm extending between a vehicle body and a side door and including first shaft means disposed on the vehicle body and and second shaft means disposed on the side door and spaced apart from each other in the longitudinal direction of the side door, a rear rotary link or second arm interconnecting the vehicle body and a portion of the side door by pivot means; the rotary shaft at the front side of the vehicle body, i.e. the first shaft means, is disposed forwardly of the rear end of a front fender and inwardly of the front fender, wherein a portion of the front fender, which covers the outer surface of the aforesaid front rotary link, includes a fixed fender and a movable fender rotatable with the front rotary link, whereby the front rotary link is disposed at a forward position where it does not hinder the occupant from getting in or out of the vehicle.

To the above end, the present invention contemplates that the rotary shaft of the aforesaid front rotary link on the side door is mounted close to the forward end portion of the side door, whereby the front rotary link is disposed at a position where it does not hinder the occupant from getting in or out of the vehicle.

To the above end, the present invention contemplates that said second shaft means of the front rotary link on the side door is disposed on an end panel at the forward end portion of said side door.

To the above end, the present invention contemplates that the rotary shaft for the rear rotary link on the vehicle body is disposed at a position close to the rear end of a front pillar, whereby the rear rotary link is disposed at a forward position where it does not hinder the occupant from getting in or out of the vehicle.

To the above end, the present invention contemplates that said movable fender comprises a portion of said front fender, said portion being disposed rearwardly of a front wheel and generally being lower than at least said front rotary link.

To the above end, the present invention contemplates that said front rotary link is disposed at the lower portion of said side door and rearwardly of a front wheel.

DETAILED DESCRIPTION OF THE PREFERRED EMBODIMENT

Description will be given of an embodiment of the present invention with reference to the accompanying drawings.

Figure 1:
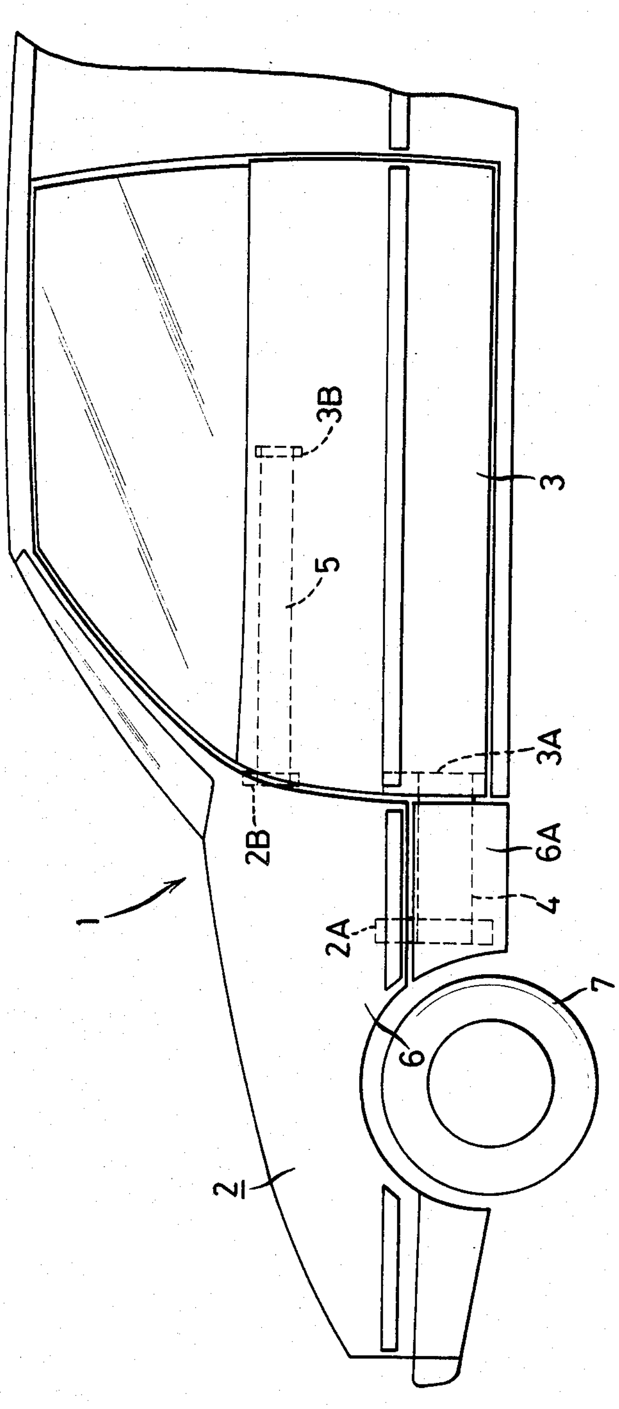
FIG. 1 is a side view showing a motor vehicle having the side door hinge mechanism according to the present invention.
Figure 2:
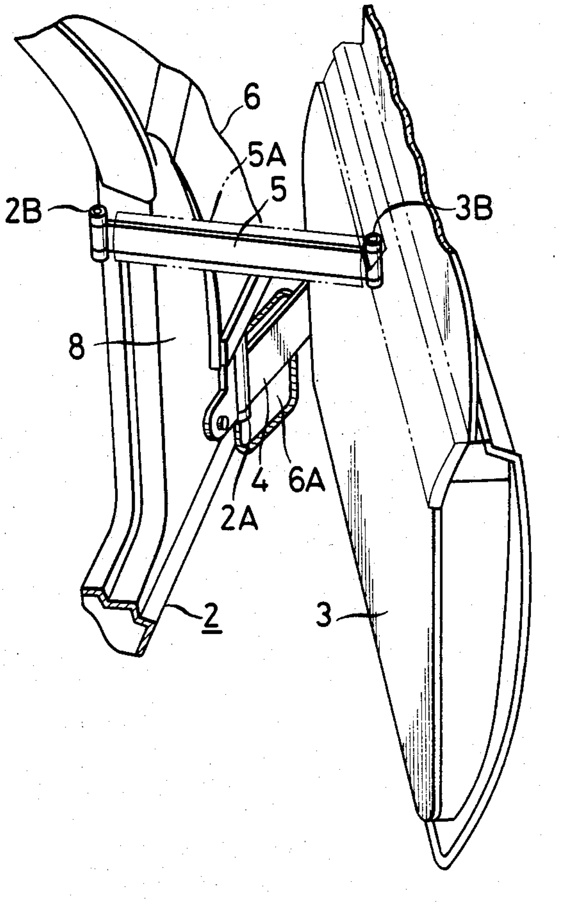
FIG. 2 is a perspective view showing an embodiment of the side door hinge mechanism in a motor vehicle according to the present invention.
Figure 3:
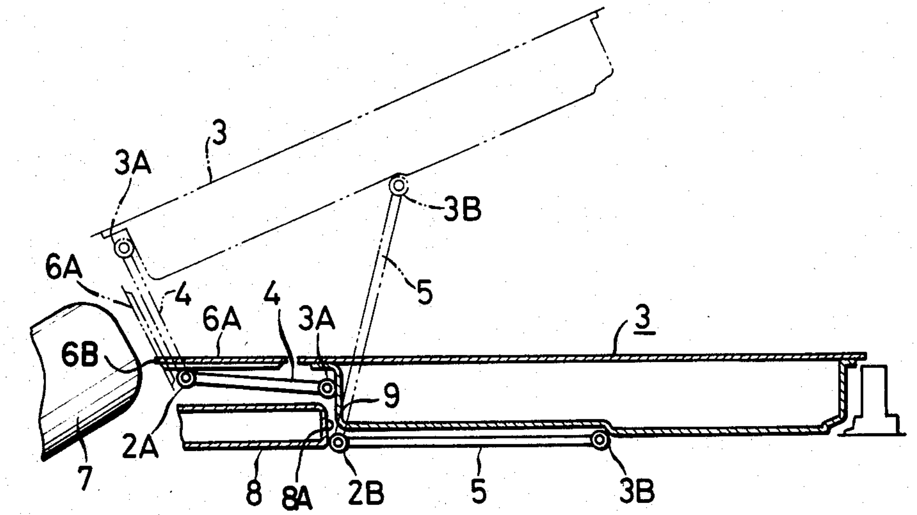
FIG. 3 is a schematic sectional plan view showing the hinge mechanism of the above embodiment when the side door is opened and closed.

As shown in FIGS. 1 through 3, according to this embodiment, a quadric crank chain comprises: a front rotary link or first arm 4 and a second rotary link or side arm 5 interconnecting the forward sides of a vehicle body 2 and a side door 3 in a motor vehicle 1 between rotary shafts 2A and 3A disposed on the vehicle body 2 and spaced apart from each other in the longitudinal direction of the vehicle body 2 and two positions on the side door 3 and spaced apart from each other in the longitudinal direction of the side door 3; the rear rotary link 5 is disposed between the rotary shafts 2B and 3B; a space is provided between the rotary shafts 2A and 2B on the vehicle body 2; and another space is provided between the rotary shafts 3A and 3B on the side door 3, whereby a side door hinge mechanism in a motor vehicle is formed.

As shown in FIG. 2, the respective rotary shafts 2A, 2B, 3A and 3B are mounted in the vertical direction of the vehicle body, and the front rotary link 4 and the rear rotary link 5 are formed to have large widths in the vertical direction, corresponding to the lengths of these rotary shafts, respectively.

As a consequence, the front rotary link 4 and the rear rotary link 5 control and define a moving path of the side door 3 during its opening or closing, and support the weight of the side door 3 as well.

The front rotary shaft 2A on the vehicle body 2 is disposed forwardly of the rear end of a front fender 6 and inwardly of the front fender 6, and a portion of the front fender 6, which covers the outer surface of the front rotary link 4, is divided from a main body of the front fender 6 to be formed into a movable fender 6A rotatable with the front rotary link 4.

The scope of rotation of this movable fender 6A as centered about the front rotary shaft 2A is provided rearwardly of a moving path of a front wheel 7 as shown in FIG. 3, so that, the movable fender 6A does not interfere with the front wheel 7.

Furthermore, the rotary shaft 3A of the front rotary link 4 on the side door 3 is disposed at a position close to the forward end portion of the side door 3, e.g. on a front end panel 9, and the rotary shaft 2B of the rear rotary link 5 on the vehicle body 2 is disposed at a position close to the rear end, i.e. mounting surface 8A, of a front pillar 8 and substantially adjacent rotary shaft 3A.

Further, the rotary shaft 3B of the rear rotary link 5 on the side door 3 is disposed at a position inwardly of the substantially central portion of the inner surface of the side door measured along the longitudinal direction of the side door 3.

The front rotary link 4 is made to be shorter in length than the rear rotary link 5, so that the rear portion of the side door 3 can be opened wider than the forward portion thereof in a fully opened state of the side door 3 as indicated by the schematic view depicted in in FIG. 3. Reference numeral 5A designates a cover of the rear rotary link 5.

In this embodiment, the side door 3 is opened or closed by the quadric crank chain mechanism, so that, even when a space at the side of the motor vehicle 1 is small, an opening for allowing the occupant to get in or out of the vehicle can be obtained without making the side door 3 to greatly project sidewards.

Furthermore, in this embodiment, a portion of the front fender 6 is formed into the movable fender 6A and this movable fender 6A is made rotatable with the front rotary link 4, whereby the front rotary link 4 and the rotary shaft 2A thereof can be pivoted forward, so that when the side door 3 is opened, the forward movement of the side door 3 can be increased to provide a sufficient opening for allowing the occupant to get in or out of the vehicle.

Additionally, when the side door 3 is opened or closed by the quadric crank chain mechanism as described above, the two rotary links 4 and 5 must support not only the weight of the side door 3 but also the angular moment of the side door 3 away from the vehicle 1. For this purpose, it is desirable that the two rotary links 4 and 5 be offset in the vertical direction.

When the front rotary link 4 and the rear rotary link 5 are offset in the vertical direction, it is desirable that at least a portion of the front rotary link 4 be positioned forwardly of the front pillar 8. In order to prevent the front rotary link 4 from interfering with the front fender 6 at this time, it is necessary to mount the front rotary link 4 onto the undersurface of a floor of the motor vehicle 1.

Typically, the front rotary link 4 supports the weight of the side door 3 in cooperation with the rear rotary link 5, so that the vertical height of the front rotary link 4 is increased. As a consequence, when the front rotary link 4 is mounted onto the undersurface of the floor of the motor vehicle 1, such a disadvantage is presented that the extent to which the front rotary link 4 projects downwardly is considerably increased.

In contrast, according to the present inventon, a lower portion of the front fender 6 is formed into the movable fender 6A and the front rotary link 4 is disposed inwardly of the movable fender 6A, so that the movable fender 6A is adjacent to and substantially beneath the fixed front fender 6 when the door is closed. Consequently, the aforesaid disadvantage can be obviated. As shown in FIG. 3, the movable fender 6A includes an extension 6B projecting forward of the rotary shaft 2A. The extension 6B defines a path of movement about the rotary shaft 2A during opening and closing of the door.

Furthermore, in this embodiment, the rotary shaft 3A of the front rotary link 4 on the side door 3 is disposed at a position close to the forward end portion of the side door 3, so that the front rotary link 4 can be desirably set in its mounted position in the vertical direction with the front rotary link 4 not interfering with the front pillar 8.

Further, in this embodiment, the rotary shaft 2B of the rear rotary link 5 on the vehicle body 2 is disposed at a position close to the rear end of the front pillar 8, so that, when the side door 3 is opened, the rear rotary link 5 can stay at a position least hindering the occupant from getting on or off the vehicle.

In addition, in the above embodiment, the weight of the side door 3 is supported by the front rotary link 4 and the rear rotary link 5. However, the present invention need not necessarily be limited to this. The two rotary links 4 and 5 merely control the moving path of the side door 3, and consequently, the weight of the side door 3 may be supported by a member other than these rotary links 4 and 5.

What is claimed is:

1. A hinge mechanism for a vehicle door comprising:

a vehicle body including a wheel section, a fender section, and a door section, said fender section being positioned adjacent to said door section and also forward of said door section as defined relative to the length of said vehicle body, said fender section having a fixed fender portion and a movable fender portion, said vehicle body also including a mounting pillar positioned substantially adjacent a forward portion of said door section when said door section is closed, said mounting pillar having a mounting surface;

support means extending between said door section and said vehicle body for supporting said door section during opening and closing thereof, said support means including a first arm and a second arm, each of said arms being substantially straight, said first arm including first shaft means adjacent said mounting pillar for pivotally mounting said door section on said vehicle body and second shaft means for pivotally mounting said door section on an end of said first arm opposite said first shaft means;

said first shaft means being positioned beneath at least a rearward section of said fixed fender portion and being mounted along said vehicle body, said movable fender portion being attached to said first shaft means for rotation with said first arm, said movable fender portion being adjacent to and substantially beneath at least said rearward section of said fixed fender portion when said door section is closed;

said movable fender portion including an extension projecting forward of said first shaft means along the length of said vehicle body when said door section is closed, wherein said extension defines a path of movement about said first shaft means during the opening and closing of said door section; and said second arm including pivot means for pivotally connecting said second arm to said mounting pillar, wherein said pivot means is mounted along said mounting surface substantially adjacent said second shaft means.

2. The hinge mechanism as defined in claim 1, wherein said door section includes an end panel extending between the exterior and interior of the vehicle along the forward portion of said door section and wherein said second shaft means is mounted along said end panel.

3. The hinge mechanism as defined in claim 1, wherein said first arm is connected to a lower portion of said door section and said second arm is connected to an upper portion of said door section.

4. The hinge mechanism as defined in claim 1, wherein the length of said first arm is less than said second arm, enabling the rearward portion of said door section to extend further away from said vehicle body, when said first arm is pivoted forward of said first shaft means.

* * * * *